United States Patent [19]
> Sheppard

[11] 3,868,991

[45] Mar. 4, 1975

[54] VALVE ASSEMBLY
[75] Inventor: William L. Sheppard, Romulus, Mich.
[73] Assignee: AVM Corporation, Jamestown, N.Y.
[22] Filed: Sept. 14, 1972
[21] Appl. No.: 288,934

[52] U.S. Cl............. 165/38, 137/525.5, 137/525, 137/512.15, 251/337, 251/DIG. 003
[51] Int. Cl.............. F16k 15/14, G05d 11/02
[58] Field of Search........... 137/512.15, 525, 525.3, 137/525.5, 540, 541, 542, 543.19, 543.23, 454.2; 138/43, 46; 220/55 PC; 251/DIG. 3, 337; 267/179, 180; 237/12.3 B; 165/38

[56] References Cited
UNITED STATES PATENTS

| | | |
|---|---|---|
| 2,241,758 | 5/1941 | Baldine................. 137/454.2 X |
| 2,310,080 | 2/1943 | Hill.................. 251/337 X |
| 3,123,096 | 3/1964 | Notaro et al.................. 137/525 |
| 3,610,279 | 10/1971 | McIntosh et al............. 251/DIG. 3 |
| 3,703,913 | 11/1972 | Carsten.................. 251/DIG. 003 |

*Primary Examiner*—William R. Cline
*Attorney, Agent, or Firm*—Harness, Dickey & Pierce

[57] ABSTRACT

A flat helical coil spring variable rate relief valve is mounted in a conduit by an improved retaining and sealing device comprising a rubber grommet pressed in the conduit and tightly engaging the outermost coils of the spring, thus permitting free operation of the valve without binding of the coils, as well as sealing with respect to the conduit. The spring valve mounting is shown used in the by-pass of an automotive heater hot water system.

19 Claims, 3 Drawing Figures

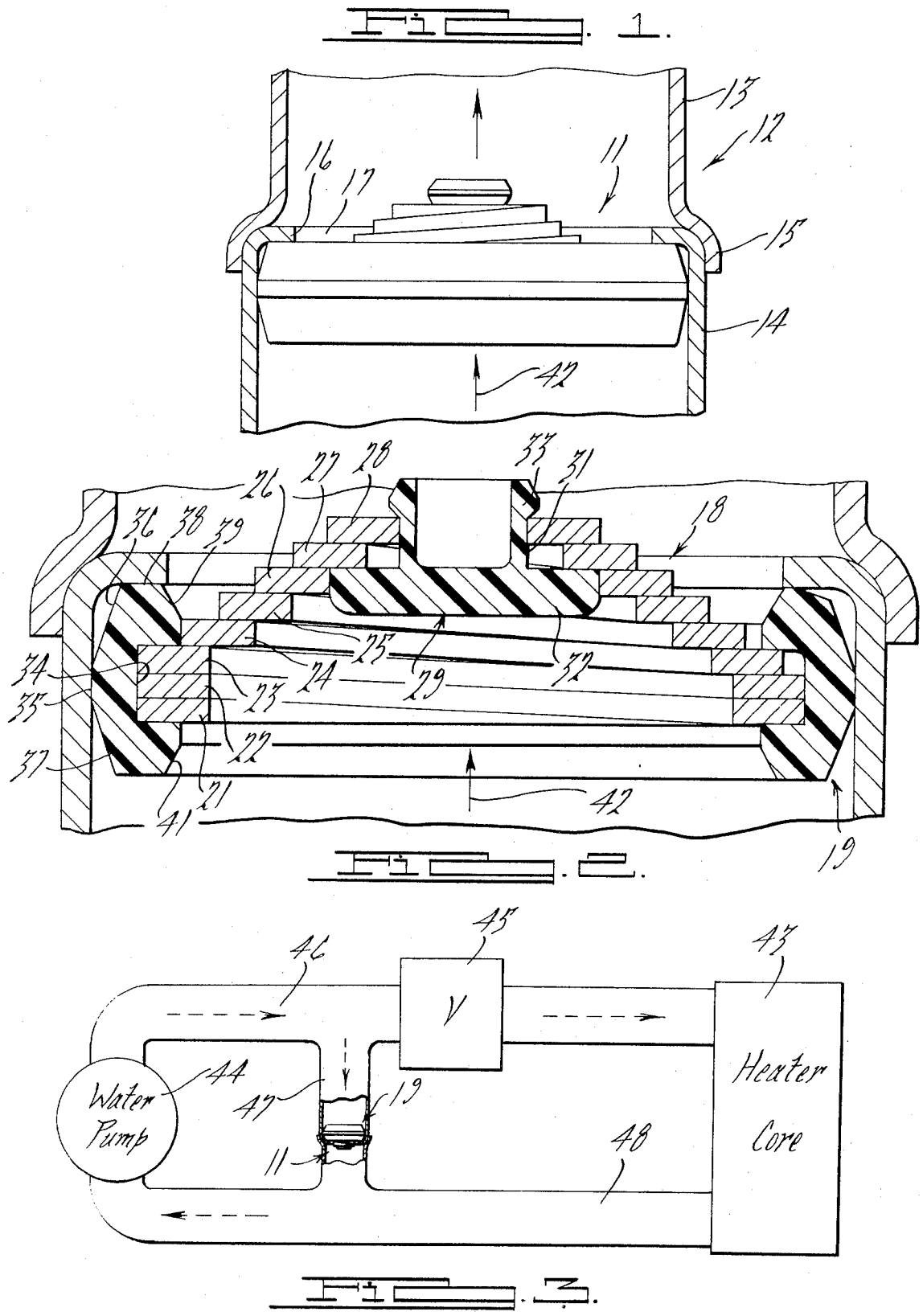

3,868,991

VALVE ASSEMBLY

BACKGROUND OF THE INVENTION

1. Field of the Invention

The invention relates to valves, and more particulary to flat helical coil spring relief valves which permit increasing flow with increasing pressure. The invention is concerned with means for mounting and sealing such valves in conduits, particularly the by-passes of automotive heater hot water systems wherein a portion of the hot water delivered by the water pump is diverted from the heater core at increased car speeds. A specific automotive heater system incorporating the present invention is illustrated in co-pending application Ser. No. 286,663 filed Sept. 6, 1972, now Pat. No. 3,807,245 and entitled Valve, which application is owned by the assignee of the present application. 2. Description of the Prior Art Variable rate flat helical coil spring relief valves are known per se and have been used in the by-pass of an automotive heater hot water system to prevent excessive pump output at increased speeds from supplying excessive water and hence heat to the heater. The relief valve is normally closed but opens at a variable rate with increased car speeds.

Problems have been encountered in such known systems because of the inherent tendency of the coil next to the outside coil to bind with whatever is securing the outside coil to the conduit. Because of its gradually increasing diameter, this next to last coil will tend to catch on the support for the outside coil, preventing proper valve functioning.

In a search for prior art relating to the present invention, the following patents, of general interest, were discovered: U.S. Pat. Nos. 3,610,279, 1,167,386, 1,079,985, 125,937 and 1,395,932 and British Pat. No. 5502 dated Dec. 31, 1880.

BRIEF SUMMARY OF THE INVENTION

According to the invention, the flat helical coil spring valve has at least one outer coil of constant diameter, and an annular grommet is provided which mounts the valve in the conduit. The grommet is of rubber or a suitable elastomeric material having equivalent characteristics. The grommet has a generally C-shaped cross-section, the slot facing inwardly and receiving several of the outer coils. The grommet is pressed into the conduit and during operation the flexible grommet material will not interfere with movement of the coils, particularly the coil next to the retained coils. The valve will thus be able to fully close, the rubber grommet both supporting and sealing the valve with respect to the conduit.

As illustrated, the valve is placed in the by-pass conduit of an automotive heater water system so as to control the volume of water diverted from the heater core as the water pump output increases with car speed.

BRIEF DESCRIPTION OF THE DRAWINGS

FIG. 1 is a cross-sectional view of a conduit having disposed therein the valve assembly of the present invention;

FIG. 2 is an enlarged sectional view similar to FIG. 1 but which also shows the valve assembly itself in cross section; and FIG. 3 is a schematic view of an automobile hot water heater system incorporating the valve assembly of the present invention.

DESCRIPTION OF THE PREFERRED EMBODIMENT

The valve and grommet assembly is generally indicated at 11 in FIG. 1 and is mounted in a conduit generally indicated at 12 having two parts 13 and 14 arranged with an overlapping joint 15. An inward shoulder 16 is formed at the end of conduit section 14 at joint 15, surrounding a central opening or passageway 17.

Assembly 11 comprises a normally closed flat helical coil spring valve generally indicated at 18 and a circular annular grommet generally indicated at 19. Valve 18 comprises a coil spring made of wire having a rectangular cross-sectional shape, with at least two outer coils 21 and 22 of the same diameter, followed by a coil 23 which starts at the same diameter and begins to spiral inwardly, and gradually becoming smaller as indicated by coils 24, 25, 26, 27 and 28. The coils overlap so that, as best shown in FIG. 2, substantially no flow will be permitted in a downward direction but flow will be permitted in an upward direction in response to a pressure differential tending to separate the coils.

A center plug generally indicated at 29 is mounted in innermost coil 28. This plug is preferably formed of nylon or a similar material and may be made of a snap-in construction, as shown in FIG. 2, having an outer groove 31 in which the inner coil of the spring is disposed. The diameter of groove 31 is preferably slightly greater than the inner diameter of coil 28, thus providing the primary seal for closing the center opening through the spring. Plug 29 has a head 32 extending outwardly at the lower end of a groove 31 and a tapered snap-through upper portion 33, the cylindrical wall of the plug being sufficiently flexible to permit insertion of portion 33 through coil 28. Alternatively, plug 29 may be spin-welded over the top of inner coil 28.

Grommet 19 is formed of an elastomeric material, preferably a rubber such as Buna-N or the like. The cross-section of grommet 19 is generally C-shaped as best seen in FIG. 2, having an inwardly facing groove 34 in which are disposed coils 21 and 22 and a portion of coil 23. It will be observed that coil 23 becomes narrower as it leads to coil 24; thus, on the left-hand side of FIG. 2 the grommet is shown fully expanded, receiving a full three coils, whereas on the right side of FIG. 2 grommet 19 is shown distorted by virtue of the fact that the transitional portion of the spring from coil 23 to coil 24 does not fully occupy groove 34. The unstressed diameter of groove 34 is preferably slightly less than the outer diameter of coils 21 and 22 and 23 so that the engagement of the bottom of groove 34 with coils 21 and 22 forms of the primary seal between grommet 19 and valve 18. To enhance this sealing action, the axial dimension or width of groove 34 is preferably slightly less than the thickness of coils 21 and 22 and that portion of coil 23 which is of the same diameter, i.e., less than an integral multiple of the thickness of a single coil. Preferably a minimum of two and a maximum of three coils are retained by the grommet.

The central portion of the grommet has a cylindrical outer surface 35 having an unstressed diameter slightly greater than the inside diameter of conduit portion 14, thus providing a sealing fit. The outer corners or edges 36 and 37 of the grommet are chamfered to provide a space which will accommodate expansion of the rubber as the valve opens and closes, without distorting the coils. These chamfers also facilitate insertion of assembly 11 into conduit 14, an annular end surface 38 of grommet 19 abutting shoulder 16. Surface 35 is rendered relatively narrow by chamfers 36 and 37, thus providing a more efficient seal. Additional chamfers 39 and 41 are provided on the inside corners or edges of grommet 19 for the purpose of streamlining fluid flow through conduit 12.

In operation of the apparatus thus far described, a fluid pressure differential in conduit 12 creating a force in the direction of arrow 42 (FIGS. 1 and 2) will act against the coils of spring 18, tending to separate them in an axial direction to permit flow. This relief valve action will be variable, in that the resistance to further opening will become greater as the pressure differential increases. This is because of the spiral configuration of the spring, each suceeding narrower coil being slightly stiffer than the preceding coil, and each coil becoming stiffer as it distorts.

Grommet 19 will prevent leakage past valve 18 by virtue of its engagement with conduit 14, shoulder 16 and spring coils 21, 22 and 23. The movement of coil 24 and that portion of coil 23 which is less than maximum diameter will be permitted in a substantially unrestricted manner by the flexible nature of grommet 19, without interfering with the sealing characteristics of the grommet and the ability of valve 18 to fully close when a pressure differential is imposed in the opposite direction. Also, there is no need to specially form the outer coil or coils of the helical spring with some form of attaching means, which would increase the cost thereof.

FIG. 3 shows a water system for an automotive heater core 43, the system having an engine driven water pump 44 and a control valve 45 in the conduit 46 between the water pump outlet and the heater core inlet. Valve 45 is of a conventional type, usually manually operated. Examples of such a valve may be found in U.S. Pat. No. 2,973,181 and in my co-pending application Ser. No. 263,863 filed June 19, 1972 and entitled "Valve".

A by-pass line 47 is provided between conduit 46 and the return conduit 48 from the heater core to the water pump, this by-pass being located upstream of valve 45. The by-pass, in which a valve assembly 11 is mounted, will divert most of the excess hot water developed by the water pump upon engine speed-up to prevent excessive heating in the heater core. Normally valve 11 will be closed at idle speeds and will begin to open as the vehicle reaches moderate speeds, the opening being at a variable rate as the speed increases. Not all the increased flow will be by-passed since some increase in heat delivery to the core is necessary to overcome the additional heat losses at higher speeds and maintain a fairly constant vehicle temperature. A typical automobile company specification calls for the flow through the heater core at 80 miles an hour to be approximately 150 percent of the flow when by-pass valve 11 is closed. Without the bypass valve it might be ten to twelve times the flow when the valve is closed.

As shown in FIG. 3, valve 18 (which is in a position inverted from that shown in FIGS. 1 and 2) is mounted in grommet 19 which in turn is pressed into conduit 14 and rests against shoulder 16. The grommet will perform its combined mounting and sealing functions as described above, and will not interfere with movement of the valve coils during operations of the vehicle.

Thus, there is disclosed in the above description and in the drawing an embodiment of the invention which fully and effectively accomplishes the object thereof. However, it will be apparent that other variations in the details of construction may be indulged in without departing from the sphere of the invention herein described, or the scope of the appended claims.

I claim;

1. Means for mounting in an axially extending conduit a helical coil spring valve formed of wire having a substantially rectangular cross section of uniform width and thickness, comprising: a generally annular element formed of an elastomeric material; means defining an outer peripheral surface on said element adapted to sealingly engage the inside wall of the conduit, the outside diameter of said surface being slightly greater than the inside diameter of the conduit when said element is in an unstressed state; means defining a continuous spring-receiving groove about the inside periphery of said element, the bottom of said groove being of generally circular cylindrical configuration and having an unstressed inside diameter slightly less than the outside diameter of the outer coil of the spring, the sides of said groove in an unstressed condition being generally parallel to one another and to a plane extending transversely to the axis of the conduit, said sides of said groove being spaced apart in an unstressed condition a distance slightly less than an integral multiple of the thickness of the spring wire in the axial direction, said groove being of a depth less than the width of the spring wire; means defining a generally annular surface on said element adapted to engage locating means in the conduit; and means defining chamfered surface on the inner and outer corners of each end of said element.

2. Means for mounting in an axially extending conduit a helical coil spring valve, comprising: a generally annular element formed of an elastomeric material; means defining an outer peripheral surface on said element adapted to sealingly engage the inside wall of the conduit; means defining a continuous spring-receiving groove about the inside periphery of said element, said groove comprising a bottom wall and opposed side walls for resiliently gripping the coil spring valve with a pinching action, said bottom wall being spaced from said outer peripheral surface throughout its entire extent; and means defining a surface on said element adapted to engage locating means in the conduit.

3. Means as claimed in claim 2, wherein the outside diameter of said outer peripheral surface is slightly greater than the inside diameter of the conduit when said element is in an unstressed state.

4. Means as claimed in claim 2, wherein the bottom of said groove is of generally circular cylindrical configuration with an unstressed inside diameter slightly less than the outside diameter of the outer coil of the spring.

5. Means as claimed in claim 2, wherein the sides of said groove extend generally transversely to the axis of the conduit.

6. Means as claimed in claim 2, wherein said groove is of a depth less than the width of the spring wire in a radial direction.

7. Means as claimed in claim 2, further comprising means defining chamfered surfaces on the outer corners of each end of said element.

8. Means as claimed in claim 2, further comprising means defining chamfered surfaces on the inner corners of each end of said element.

9. Means as claimed in claim 2, further comprising means defining chamfered surfaces on the inner and outer corners of each end of said element.

10. Means as claimed in claim 2, wherein said sides of said groove are spaced apart a distance less than three and greater than two thicknesses of a spring coil in the axial direction when said element is in an unstressed condition.

11. Means as claimed in claim 2, wherein the sides of said groove are spaced apart a distance slightly less than an integral multiple of the thickness of the spring wire in the axial direction when said element is in an unstressed condition.

12. A relief valve assembly comprising: a helical coil spring made of wire having a rectangular cross-sectional shape, the coils of said spring having a plurality of relatively large outer turns of constant diameter and successive turns of gradually decreasing diameter, said coils overlapping one another so that the spring is normally closed, said coils being separable in response to a pressure differential in one direction to permit flow therethrough between the coils thereof; a conduit in which said spring is disposed; means defining a shoulder in said conduit; a generally annular element formed of an elastomeric material disposed in said conduit; means defining an outer peripheral surface on said element sealingly engaging the inside wall of said conduit; means defining a continuous groove about the inside periphery of said element, the outer peripheries of said coils of constant diameter being disposed in said groove, the flexibility of said element being such that the next innermost coil from the coils of constant diameter may move axially between open and closed positions during operation of the valve without interference by said element; and means defining a surface on said element adapted to engage said shoulder in said conduit.

13. An assembly as claimed in claim 12, wherein said groove is of a depth less than the width of the spring wire in a radial direction.

14. An assembly as claimed in claim 12, wherein the radial thickness of said element is greater than one-half the difference between the maximum diameter of said spring and the inside diameter of said conduit.

15. An assembly as claimed in claim 12, wherein the bottom of said groove is spaced from said outer peripheral surface a distance greater than one-half the difference between the maximum diameter of said spring and the inside diameter of said conduit.

16. A relief valve assembly as claimed in claim 12, further comprising central plug means for preventing flow through the innermost coil of said spring.

17. In a hot water system for supplying an automotive heater core, including a first conduit leading to the inlet of the heater core, a second conduit leading from the outlet of the heater core, and a by-pass conduit connecting the second conduit to the first conduit: a helical coil spring made of wire having a rectangular cross-sectional shape disposed with the by-pass conduit; the coils of said spring having a plurality of relatively large outer turns of constant diameter and successive turns of gradually decreasing diameter, said coils overlapping one another so that the spring is normally closed; central plug means for preventing flow through the innermost spring coil, said coils being separable in response to a pressure differential in one direction to permit flow therethrough between the coils thereof; a generally annular element formed of an elastomeric material disposed in said by-pass conduit; means defining an outer peripheral surface on said element sealingly engaging the inside wall of said by-pass conduit; and means defining a continuous groove about the inside periphery of said element, the outer peripheries of said coils of constant diameter being disposed in said groove, the flexibility of said element being such that the next innermost coil from the ciols of constant diameter may move axially between open and closed positions during operation of the valve without interference by said element.

18. In a hot water system for supplying an automotive heater core, including a first conduit leading to the inlet of the heater core, a second conduit leading from the outlet of the heater core, and a by-pass conduit connecting the second conduit to the first conduit to by-pass the heater core: a helical coil spring disposed within the by-pass conduit, the coils of said spring having a plurality of relatively large outer turns of constant diameter and successive turns of gradually decreasing diameter, said coils overlapping one another and having means for preventing flow through the innermost spring coil whereby flow through the by-pass conduit is normally restricted, said coils being separable in response to a pressure differential in one direction to permit flow between the coils thereof and through the by-pass conduit; a generally annular element formed of an elastomeric material disposed in said by-pass conduit; means defining an outer peripheral surface on said element sealingly engaging the inside wall of said by-pass conduit; and means on said element for retaining the outer peripheries of said coils of constant diameter such that the next innermost coil from the coils of constant diameter may move axially between open and closed positions during operation of the valve without interference by said element.

19. A valve for a hot water system including an automotive heater core, a first conduit leading to the inlet of the heater core, a second conduit leading from the outlet of the heater core, and a by-pass conduit connecting the second conduit to the first conduit to by-pass the heater core, said valve comprising: a helical coil spring disposed within the by-pass conduit, the coils of said spring having a plurality of relatively large outer turns of constant diameter and successive turns of gradually decreasing diameter, said coils overlapping one another and having means for preventing flow through the innermost spring coil whereby flow through the by-pass conduit is normally restricted, said coils being separable in response to a pressure differential in one direction to permit flow between the coils thereof and through the by-pass conduit; a generally annular element formed of an elastomeric material disposed in said by-pass conduit; means defining an outer peripheral surface on said element sealingly engaging the inside wall of said by-pass conduit; and means defining a continuous groove about the inside periphery of said element, the outer peripheries of said coils of constant diameter being disposed in said groove, the flexibility of said element being such that the next innermost coil from the coils of constant diameter may move axially between open and closed positions during operation of the valve without interference by said element.

* * * * *